United States Patent [19]

Yasuhara et al.

[11] Patent Number: 5,033,921
[45] Date of Patent: Jul. 23, 1991

[54] TRACTION DRIVE TOOL ADAPTER

[75] Inventors: Shinji Yasuhara; Kouichi Ueda; Toshiaki Oku; Kazuo Rokkaku, all of Osaka; Eiichi Katayama, Matsubara, all of Japan

[73] Assignees: Koyo Seiko Co., Ltd., Osaka; Showa Tool Co., Ltd., Toyonaka, both of Japan

[21] Appl. No.: 472,373

[22] Filed: Feb. 1, 1990

[30] Foreign Application Priority Data

Feb. 10, 1989 [JP] Japan .................. 1-14114[U]
Feb. 10, 1989 [JP] Japan .................. 1-14115[U]
Feb. 10, 1989 [JP] Japan .................. 1-29600
Jul. 31, 1989 [JP] Japan .................. 1-196517

[51] Int. Cl.$^5$ .................. B23B 47/30; F16H 13/06
[52] U.S. Cl. .................. 409/135; 279/1 A; 408/126; 409/144; 409/232; 475/183
[58] Field of Search .................. 408/126; 279/1 A; 409/134, 136, 144, 232, 234; 475/165, 166, 183, 196, 331

[56] References Cited

U.S. PATENT DOCUMENTS

| | | | |
|---|---|---|---|
| 4,491,038 | 1/1985 | Kraus | 74/798 |
| 4,741,650 | 5/1988 | Nakata | 408/137 |
| 4,950,110 | 8/1990 | Suzuki | 408/126 |
| 4,960,405 | 10/1990 | Katayama et al. | 475/183 |
| 4,981,403 | 1/1991 | Katayama | 408/126 X |

FOREIGN PATENT DOCUMENTS

| | | |
|---|---|---|
| 3403360 | 8/1985 | Fed. Rep. of Germany . |
| 1163949 | 10/1958 | France . |
| 284519 | 11/1952 | Switzerland . |
| 645778 | 2/1979 | U.S.S.R. . |
| 191537 | 1/1923 | United Kingdom . |

Primary Examiner—Steven C. Bishop
Attorney, Agent, or Firm—Fleit, Jacobson, Cohn, Price, Holman & Stern

[57] ABSTRACT

A traction drive tool adapter, has a rotary portion provided at its front half section with planetary roller-inserting bores extending radially from the outer circumferential surface of the rotary portion into a central bore therein, each of the roller-inserting bores having planetary rollers driving shaft member-setting grooves continuing from two ends of the roller-inserting bore that are opposed to each other in the axial direction of the central bore. Each driving shaft member which supports a relative planetary roller is set in the front half section of the rotary portion by inserting the planetary roller from the side of the outer circumferential surface of the front half section in the radial direction of the rotary portion into the roller-inserting bore, and the end sections of the shaft member into the shaft member-setting grooves, and the outer circumferential section of each planetary roll is engaged with an annular fixed track in a fixed portion of the adapter and the outer circumferential section of a sun roller in a tool mount portion of the adapter. A thread is provided in a through bore extending from the rear end of the rotary portion to the central bore in the axial direction thereof, and a male screw is engaged with the thread. Labyrinth seals are provided at the outer ends of the relative rotary regions between the fixed, rotary and tool must portions, and elastic contact lip-carrying rings are fitted on the inner side of the labyrinth seals.

10 Claims, 5 Drawing Sheets

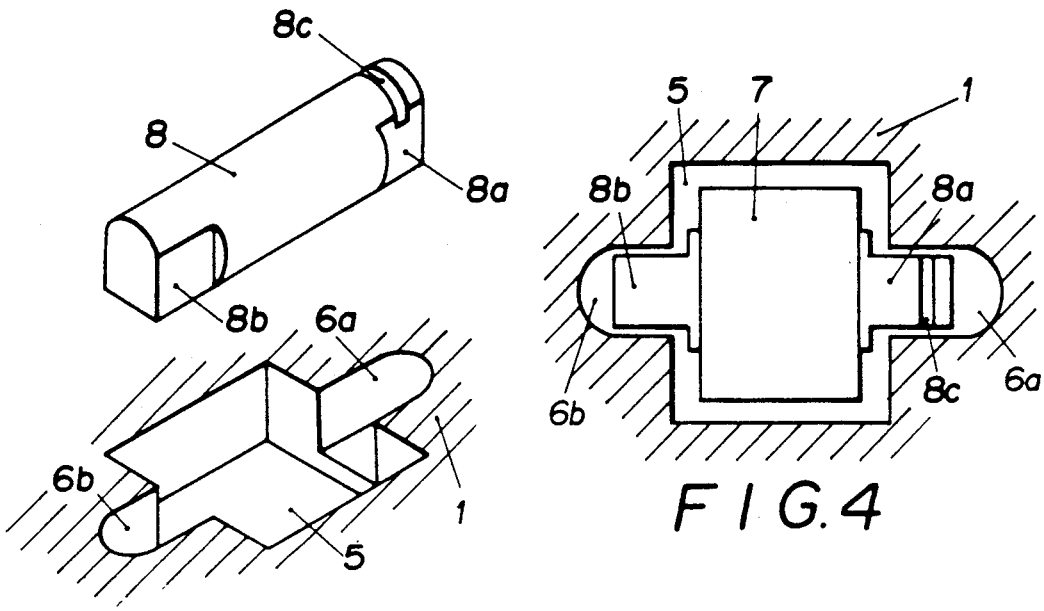
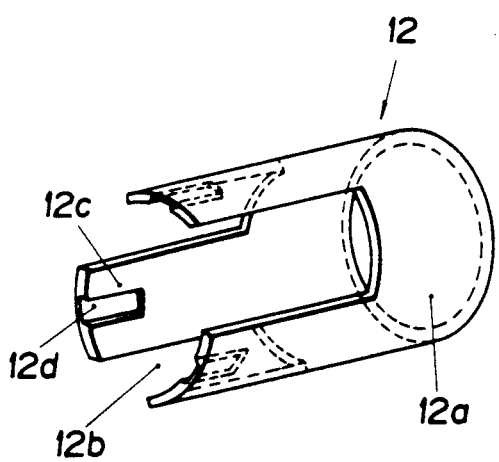
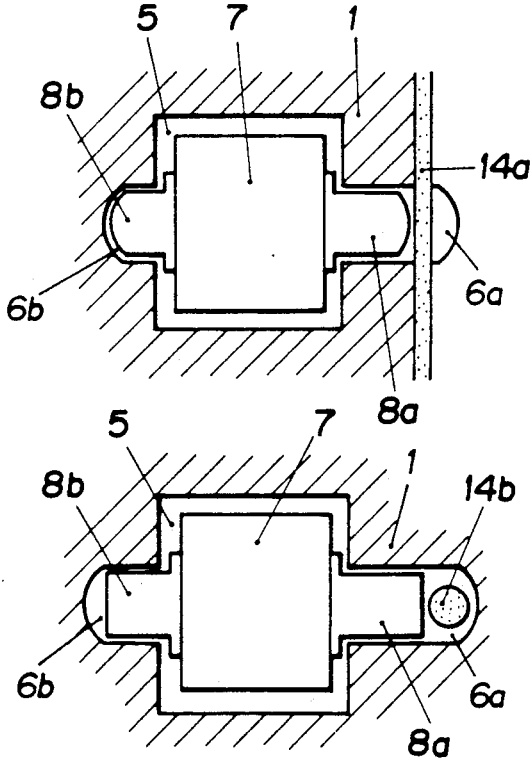
FIG. 3
FIG. 4
FIG. 6(a)
FIG. 5
FIG. 6(b)

TRACTION DRIVE TOOL ADAPTER

BACKGROUND OF THE INVENTION

1. Field of the Invention

This invention relates to a traction drive tool adapter, namely, a tool adapter with an epicyclic roller speed-increasing mechanism to be connected to main shafts of various machine tools and more particularly to such an adapter best suited for rotating a small diameter cutting tool at a high speed.

2. Description of the Prior Art

It is known from the prior art to provide a traction drive tool adapter consisting of a rotary portion inserted firmly into a main shaft of a machine tool, a fixed portion detachably joined to a fixed part, for example, a main shaft head and a mounting portion to which a tool is attached for example, FIG. 9 shows a tool adapter with an epicyclic roller speed-increasing mechanism, a hollow shaft 1 at the front end section of the rotary portion and a taper shank 3 at the rear end section thereof which has a grooved flange 2 at the intermediate section of the rotary portion separately formed but unitarily combined by a coaxially inserted bolt 60 at a taper surface 61.

The reasons why the rotary portion is formed in this manner reside in that the driving pins 8 for planetary rollers 7 have to be fitted firmly by axial press fitting in the mounting bores 62 provided so as to extend axially in the cylindrical circumferential wall of the hollow shaft 1.

Thus, the planetary rollers in the rotary portion, a sun roller in the tool mount portion and an annular fixed track surface of the fixed portion are in contact with each other with a predetermined level of pressing force.

In order to disassemble the tool mount portion, there is no other way than to forcibly withdraw this portion from the front end thereof against the friction occurring due to the pressing force mentioned above, and such a method is actually employed.

In order to prevent the entry of a cutting fluid from the relative rotary portion to the interior of the adapter, regularly used oil seals S are fitted between the rotary portion A and fixed portion B and between the rotary portion and tool mount portion C as shown in FIG. 9.

In the above-described prior art traction drive tool adapter, the hollow shaft 1 at the front end section of the rotary portion and the taper shank 3 at the rear end section thereof which has a grooved flange 2 at the intermediate section of the rotary portion are separately formed and unitarily combined by the coaxially inserted bolt 60 at the taper surface 61. Therefore, the connecting rigidity of the hollow shaft 1 and taper shank 3 is low, and insufficient surface contact, which would cause the vibration of the hollow shaft 1 and taper shank 3 when they are rotated, at the taper surface 61 between the hollow shaft and taper shank inevitably occurs.

Moreover, the positional accuracy of the mounting bores 62 have influence upon the contact pressure of the planetary rollers 7 against the annular fixed track surface 32 and the outer circumferential surface of the sun roller 52.

This planetary speed traction drive tool adapter has no suitable portions to be gripped for carrying out the disassembling of the tool mount portion. Therefore, if the tool mount portion is withdrawn forcibly against the friction occurring due to the above-mentioned press-contacting force, the tool adapter is damaged.

The oil seals serving as the means for preventing the entry of a cutting fluid from the relative rotary portion of a prior art traction drive tool adapter described above into the interior of the adapter have no problems in particular while the tool adapter is used at a low rotational speed but they generate much heat due to the friction of the contacting sections, so that various problems arise.

BRIEF SUMMARY OF THE INVENTION

The traction drive tool adapter according to the present invention consists of a fixed portion composed of a hollow housing detachably joined to a fixed portion of a machine tool, a rotary portion composed of a front half section which is provided with a central bore and inserted and supported rotatably in the housing, and a rear half section of which is fitted firmly in a main shaft of the machine tool, and a tool mount portion inserted into the central bore opened at the front end section of the rotary portion, rotatable with respect to the fixed and rotary portions, joined to the rotary portion via an epicyclic roller speed-increasing mechanism and adapted to hold a tool at the front end section thereof, the front half section of the rotary portion being provided with planetary rolling member-inserting bores extending radially from the outer circumferential surface thereof into the central bore therein, each of the rolling member-inserting bores having planetary rolling member driving shaft member-setting grooves continuing from such two ends of the rolling member-inserting bore that are opposed to each other in the axial direction of the central bore, each driving shaft member which supports a relative planetary rolling member being set in the front half section of the rotary portion by inserting the rolling member from the side of the outer circumferential surface of the front half section in the radial direction of the rotary portion into the rolling member-inserting bore and the end sections of the shaft member into the shaft member-setting grooves, the outer circumferential section of each planetary rolling member being engaged with an annular fixed track in the fixed portion and the outer circumferential section of a sun member in the tool mount portion.

In order to easily detach the tool mount portion, a thread may be provided in a through bore extending from the end of the rear half section of the rotary portion to the central bore in the axial direction thereof, with which thread a male screw may be engaged.

The outer end sections of the relative rotational regions between the fixed portion, rotary portion and tool mount portion are provided with labyrinth seals, and contact lip-carrying cross-sectionally V-shaped rings of an elastic material are fitted in the spaces adjacent to and at the inner side of the labyrinth seals.

When the main shaft of a machine tool on which this tool adapter with epicyclic roller speed-increasing mechanism is provided is rotated, the rotary portion is rotated with respect to the hollow housing combined with the fixed portion of the machine tool. Consequently, the planetary rolling bodies supported rotatably via the driving shaft members on the front half section of the rotary portion rotate on their own axes, i.e. the driving shaft members as they contact the annular fixed track surface of the housing and the outer circumferential surface of the sun member of the tool mount portion, and these rolling bodies are rotated around the main shaft at the same time. This causes the sun member, i.e., the tool attached to the tool mount portion to be rotated at an increased speed as compared with the speed of the rotation of the rotary portion, i.e. the main shaft.

While this tool is rotated at a low speed during cutting and grinding operations carried out by this tool, the entry of the cutting fluid and grinding fluid into the interior of the adapter is prevented by the cross-sectionally V-shaped rings, the contact lips of which are in contact with the relative sections of the rotary portion.

While the tool is rotated at a high speed, the contact lips of the cross-sectionally V-shaped rings are bent due to the centrifugal force and disengaged from the relative sections of the rotary portion, so that the frictional heat is not generated. In this case, the entry of the cutting fluid and grinding fluid into the interior of the adapter is prevented by the labyrinth seals installed along with the V-shaped rings.

In order to disassemble the tool mount portion of the tool adapter with epicyclic roller speed-increasing mechanism which has a thread in a through bore extending from the end of the rear half section of the rotary portion to the central bore in the axial direction thereof, and a male screw member engaged with this thread, a screw driver is inserted from the rear end of this tool adapter into the through bore, and the male screw member is turned thereby so as to advance the same toward the front end of the adapter. As a result, the male screw member presses the rear end surface of the sun roller constituting the rear end section of the tool mount portion. Owing to this pressing force, the sun roller is disengaged from the planetary rollers against the frictional force, traction force between the sun roller and planetary rollers, so that the tool mount portion is withdrawn easily from the front end of the tool adapter. If the screw driver is thereafter turned in the opposite direction, the male screw member is returned to its original position.

Therefore, it is an object of the present invention to provide a tool adapter with epicyclic roller speed-increasing mechanism having these characteristics and free from the previously-described drawbacks encountered in a conventional tool adapter with an epicyclic roller speed-increasing mechanism of this kind.

The above and other objects as well as advantageous features of the invention will become apparent from the following description of the preferred embodiments taken in conjuction with the accompanying drawings.

BRIEF DESCRIPTION OF THE DRAWINGS

FIG. 3 is a perspective view of a driving pin and a planetary roller inserting bore in the embodiment of the traction tool adapter according to the present invention;

FIG. 4 is a plan view of a driving pin and a planetary roller, which are set in a planetary roller inserting bore, in the embodiment of the traction tool adapter according to the present invention;

FIG. 5 is a perspective view of a comb type spacer in the embodiment of the traction tool adapter according to the present invention;

FIGS. 6a and 6b are cross-sectional views showing means for inserting and positioning a driving pin and a planetary roller in the embodiment of the traction tool adapter according to the present invention;

DESCRIPTION OF THE PREFERRED EMBODIMENTS

The embodiments of the present invention will now be described with reference to the drawings.

Figure 1:
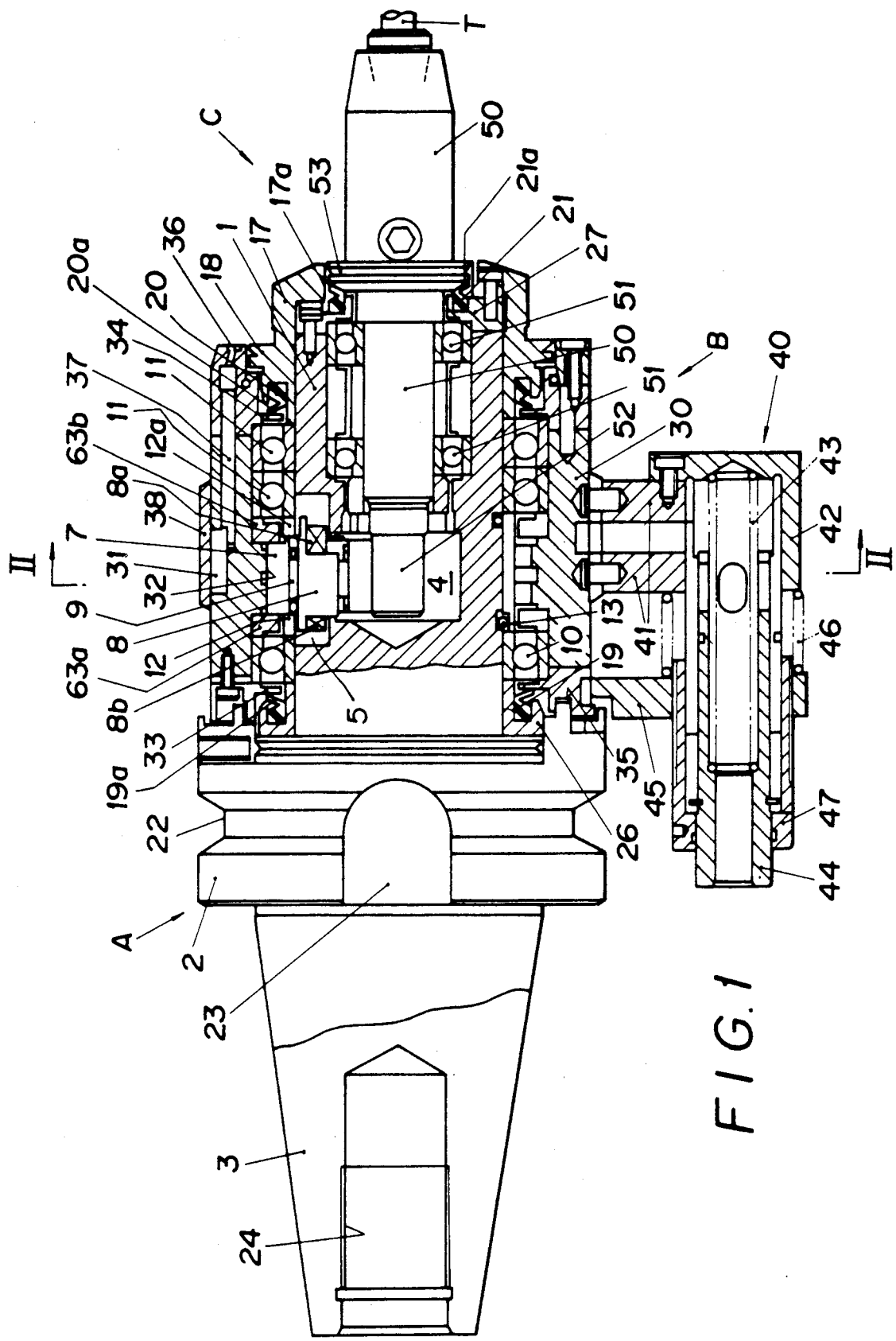
FIG. 1 is a partially cross-sectional view of a first embodiment of the traction tool adapter, namely, the tool adapter with epicyclic roller speed-increasing mechanism according to the present invention.
Figure 2:
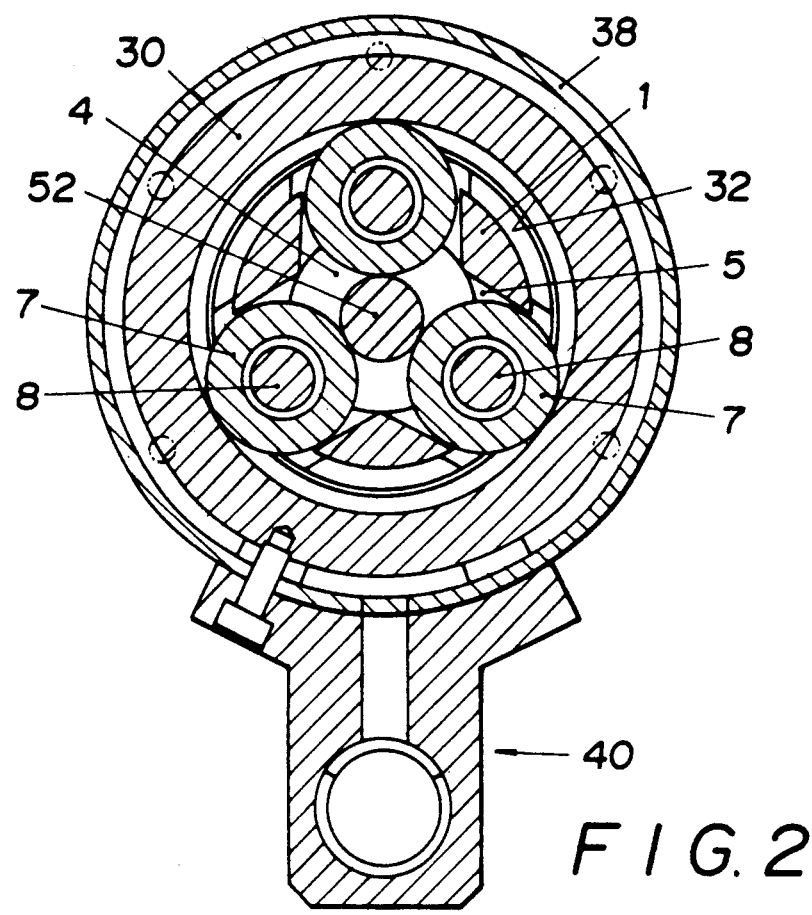
FIG. 2 is a schematic cross-sectional view taken along line II—II in FIGS. 1 and 8.

Referring to FIG. 1, a traction tool adapter consists of a rotary portion A fitted firmly into a main shaft of a machine tool, such as a machining center, a fixed portion B joined detachably to a fixed portion, for example, a main shaft head of the machine tool, and a tool mount portion C to which a tool is attached.

In the rotary portion A, a hollow shaft 1 at the front end section thereof, a grooved flange 2 at the intermediate section thereof and a taper shank 3 at the rear end section thereof are formed unitarily so that they have coaxial relation.

As shown in FIGS. 1-4, the hollow shaft 1 is provided in its intermediate portion with cross-sectionally rectangular planetary roller inserting bores 5, 5, 5 (three bores regularly spaced at a central angle of 120° in the illustrated embodiment) extending radially from the outer circumferential surface of the shaft 1 to a central bore 4, and also cross-sectionally rectangular grooves 6a, 6b which continue from such ends of each bore 5 that are opposed to each other in the axial direction of the hollow shaft 1, and which are used to set a planetary roller driving pin therein.

The planetary rollers 7 are mounted rotatably on driving pins 8, each of which has journals 8a, 8b of a substantially rectangular cross section, via needle roller bearings 9. In order to set a driving pin 8, on which a planetary roller 7 is mounted, on the hollow shaft 1, the planetary rollers 7 and journals 8a, 8b are inserted radially from the radially outer side of the hollow shaft 1 into the bore 5 and grooves 6a, 6b, respectively. Thus, each planetary roller 7 is set in the hollow shaft 1 so that the planetary rollers 7 can be rotated in the bore 5.

As will be described later, the rotary portion A is supported rotatably on the fixed portion B via ball bearings 10, 11, 11. At both ends of each of the bores 5, 5, 5, the inner race in the ball bearing (for example, an angular ball bearing having a ceramic ball) 10 and those in the ball bearings 11, 11 are provided via a comb type spacer 12 which is formed as shown in FIG. 5, so as not to interfere with the planetary rollers 7. The inner races of the ball bearings are fitted on the shaft 1 by a tight fit, and the outer races we set in the housing 30 by a tight fit. The comb type spacer 12 consists of a cylindrical member formed so as to have axial recesses 12b, the number, phase and width of which are in agreement with those of the planetary rollers inserting bores 5, with an annular end portion 12a of the cylindrical member left uncut. Accordingly, the planetary rollers 7 are set in the bores 5 and simultaneously inserted in the axial recesses 12b in the comb type spacer 12.

The comb type spacer 12 is positioned by the engagement of steel balls 13 fitted in the bores in the outer circumferential surface of the hollow shaft 1 with recesses 12d formed in the inner circumferential surfaces of the free end portions 12c of the teeth of the comb type spacer 12, so that the interference of the spacer 12 with the planetary rollers 7 is prevented.

Since the driving pin inserting grooves 6b are covered with the ball bearing 10 and a flanged race 63a, the driving pin inserting grooves 6a are lengthened slightly in the axial direction for the convenience of inserting the driving pins 8, on which the planetary rollers 7 are mounted, into the bores 5. First, one end of a driving pin 8 is set flush with the corresponding end surface of the relative planetary roller 7 (so that the driving pin 8 projects toward a driving pin inserting groove 6a) and this driving pin 8 is set in a bore 5, the driving pin 8 being thereafter displaced toward the groove 6b.

The means shown in FIGS. 6a and 6b for preventing the driving pin 8 from being displaced afterwards toward the groove 6a are also provided. The means shown in FIG. 6a consists of an O-ring 14a fitted in a circumferential groove formed in the outer circumferential surface of the intermediate portion of the hollow shaft 1, with which O-ring 14a the end surface of the journal 8a is engaged. The means shown in FIG. 6b consists of a filler, such as a rubber ball 14b inserted in the unoccupied portion of the groove 6a, with which rubber ball 14b the end surface of the journal 8a is engaged.

Thus, the planetary roller 7 is set in the central position in the bore 5, i.e., on the hollow shaft 1 so that the rollers 7 can be rotated in the bore 5.

The following means may be provided for preventing the fretting abrasion from occurring on the contact surfaces between the journals 8a, 8b of a driving pin 8 and grooves 6a, 6b. For example, thin-walled caps of polyurethane having the same shape as the journals 8a, 8b are fitted therearound, or a solid lubricant, such as Teflon particles are permeated into and fixed in the contact surfaces between the journals 8a, 8b of a driving pin 8 and grooves 6a, 6a, and grease is then applied to the resultant contact surfaces.

If a locking groove 8c for use in disassembling the planetary roller 7 is provided in the outer circumferential surface of a journal 8a, a roller disassembling operation can be carried out conveniently.

Figure 7:
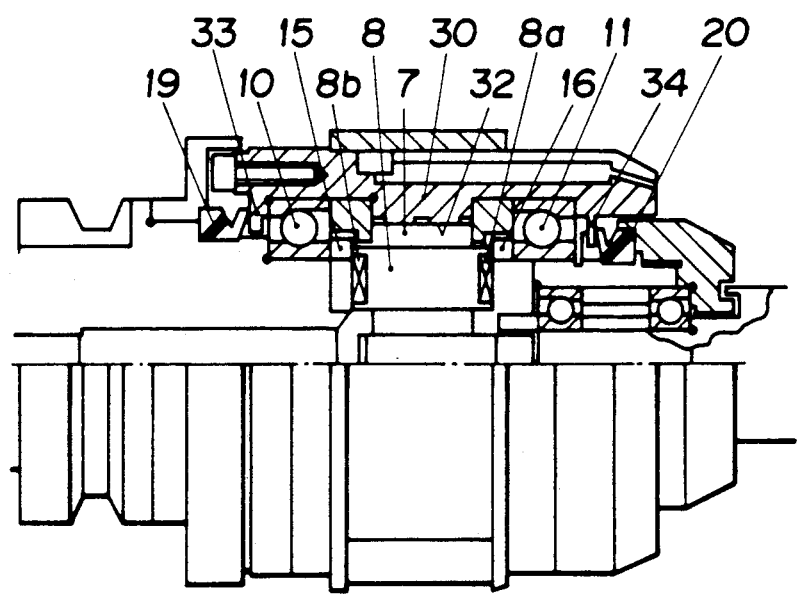
FIG. 7 is a partially cross-sectional view of a substitute means for the comb type spacer in the embodiment of the traction tool adapter according to the present invention.

A driving pin 8 itself may be used as a spacer as shown in FIG. 7, without using the comb type spacer 12. In this case, rings 15, 16 are inserted between the inner and surfaces of the inner races in the ball bearings 10, 11, 11 and both end surfaces of the driving pin 8.

A pre-load can be imparted to the ball bearings 10, 11, 11 by utilizing the comb type spacer 12 or driving pins 8 themselves.

A cross-sectionally V-shaped ring 19 of an elastic material having a contact lip 19a is attached to the portion of the outer circumferential surface of the hollow shaft 1 which is between a grooved flange 2 and the rear end surface of the ball bearing 10 via an annular mounting member 26, and a cross-sectionally V-shaped ring 20 of an elastic material having a contact lip 20a, directly to the portion of the outer circumferential surface of the shaft 1 which is between the front end surface of the ball bearings 11, 11 and the rear end surface of a labyrinth seal 18 formed like a flange at the rear end of a cap-like member 17 fitted firmly around the front end portion of the shaft 1.

A cross-sectionally V-shaped ring 21 of an elastic material having a contact lip 21a is mounted by an annular mounting member 27 on the front end surface of the hollow shaft 1 so that the ring 21 is opposed to a front end bore 17a in the cap-like member 17.

In the rotary portion A, an annular groove 22 and a keyway 23 are formed in the grooved flange 2, and an exchanger hand of an automatic tool changing unit and a key on the main shaft are engaged with them, respectively.

In the first embodiment shown in FIG. 1, a tension rod of the main shaft of the machining center is engaged with a threaded bore 24 made in the rear end surface of the taper shank 3, and the taper shank 3 is fitted firmly in a taper bore in the main shaft.

Figure 8:
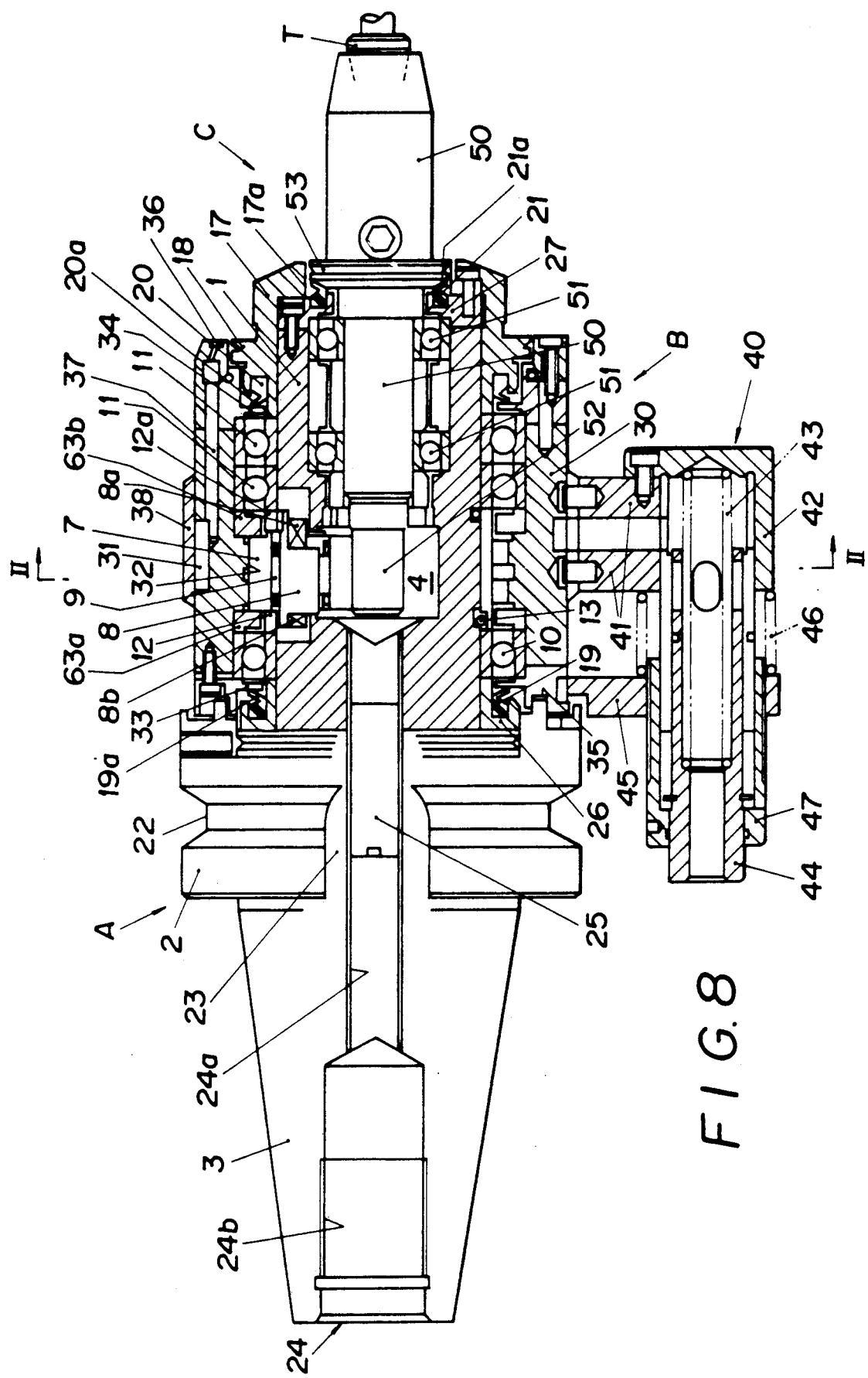
FIG. 8 is a partially cross-sectional view of a second embodiment of the traction tool adapter according to the present invention.
Figure 9:
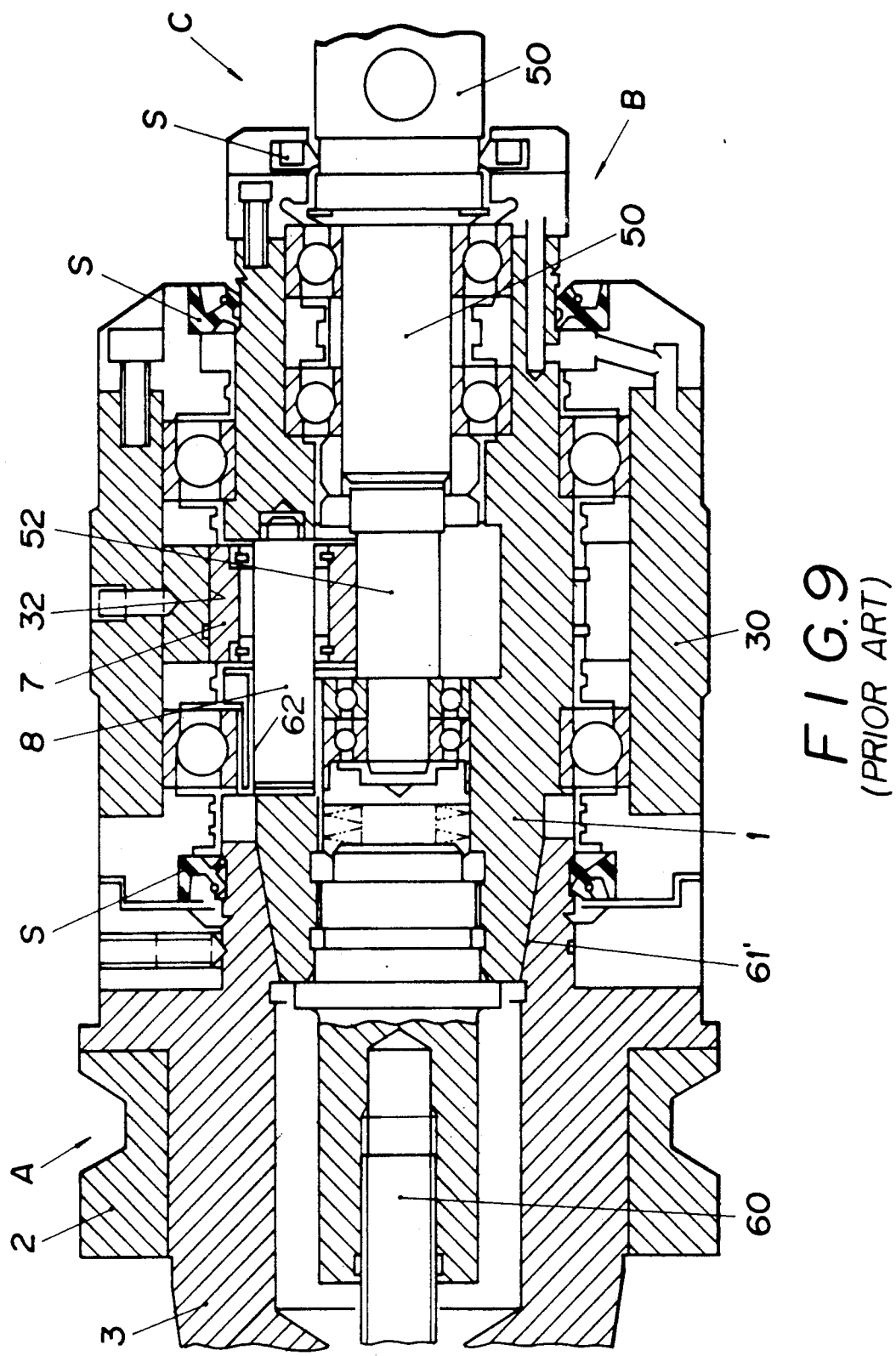
FIG. 9 is a partially cross-sectional view of a prior art traction tool adapter.

In the second embodiment shown in FIG. 8, a stepped threaded bore 24 is provided so as to extend from the rear end surface of the taper shank 3 to the central bore 4 in coaxial relation thereto, a headless bolt 25 is engaged with a front threaded portion 24a, the tension rod of the main shaft of the machining center being engaged with a rear threaded portion 24b.

The fixed portion B consists of a hollow, substantially cylindrical housing 30 having a jacket recess 31 in the outer circumferential surface of the intermediate portion thereof; an annular fixed track surface 32 for the planet rollers, which is formed on the inner circumferential surface of the intermediate portion of the housing; projections 33, 34 on the inner circumferential surfaces of both end portions of the housing, which projections 33, 34 closely contact the contact lips 19a, 20a of cross-sectionally V-shaped rings 19, 20; a labyrinth seal 35 between the rear end surface of the housing and grooved flange 2; a passage 37 extending from the jacket recess 31 toward a cutting (grinding) fluid ejection port 36 in the front end surface of the housing; and a jacket cover 38 enclosing the jacket recess 31 and fitted firmly around the outer circumferential surface of the housing.

In order to firmly fit this jacket cover 38 around the housing, the inner and outer surfaces of the housing 30 are machined, and the jacket cover 38 is tight-fitted therearound, the inner circumferential surface of the housing 30, such as the annular fixed track surface 32 being finish-ground. This enables the strain, which is ascribed to the tight-fitting of the jacket cover 38, to be removed, and the precision of the housing 30 to be maintained at a high level.

The hollow housing 30 is further provided on its outer circumferential surface with an anti-rotation unit 40, which consists of brackets 41 projecting radially from the outer circumferential surface of the housing 30, a guide sleeve 42 fixed to these brackets 41 and extending in parallel with the main shaft, an anti-rotation pin 44 fitted slidably in the guide sleeve 42 and urged backward in the axial direction of the main shaft by a compression spring 43, and a regulating sleeve 47 which is provided with a locking arm 45 engageable with and disengageable from a positioning bore in the front end surface of the grooved flange 2 and projecting in the radial direction of the sleeve 47, and which is fitted slidably around the guide sleeve 42 and anti-rotation pin 44 and urged backward in the axial direction of the main shaft by a compression spring 46. The front end portion of the anti-rotation pin 44 is adapted to engage a locking recess in an anti-rotation member at the front end surface of the fixed portion of the machining center, for example, the main shaft head when the taper shank 3 is to be fitted in the main shaft.

In the hollow housing 30 fixed to the outer circumferential surface of the hollow shaft 1, the outer races in the ball bearings 10; 11, 11 are fixed to the portions of the inner circumferential surface of the housing which are at the front and rear sides of the annular fixed track surface 32, and the contact lips 19a, 20a of the cross-sectionally V-shaped rings 19, 20 closely engage the projections 33, 34, the outer circumferential surfaces of the planetary rollers 7, 7, 7 being engaged with the annular fixed track surface 32, the inner circumferential surface of the front end portion of the housing 30 being opposed to the labyrinth seal 18.

The tool mount portion C consists of a rotary shaft 50 inserted rotatably in the central bore 4 in the hollow shaft 1 via ball bearings (for example, angular ball bearings having ceramic balls) 51, 51. The inner races of the ball bearings are fitted on the rotating shaft 50 by a tight fit, and the outer races set in the shaft 1 by a tight fit. The rear end portion of the rotary shaft 50 forms a sun roller 52 engaged at its outer surface with the planetary rollers 7, 7, 7, and projects at its front end portion from the front end bore 17a in the cap-like member 17 in the tool mount portion C, a taper bore being formed, in which a taper shank of a tool T is fitted, in the front end portion of the rotary shaft 50. The portion of the rotary shaft 50 with which the front end bore 17a in the cap-like member 17 is engaged is provided with a flange type labyrinth seal 53, with the rear surface of which the contact lip 21a of the cross-sectionally V-shaped ring 21 is closely engaged.

The annular fixed track surface 32, planetary rollers 7, 7, 7 and sun roller 52 constitute a traction drive, epicyclic roller speed-increasing mechanism.

The operation of the above-described traction tool adapter will now be described.

When the shank of a predetermined tool T is fitted firmly in the taper bore in the front end portion of the rotary shaft 50, the tool T is gripped by the traction tool adapter. During this time, the locking arm 45 is engaged with the positioning bore in the front end surface of the grooved flange 2 by the resilient force of the compression spring 46, and the rotary portion A and fixed portion B have a fixed relation, the keyway 23 and tool T having a predetermined relative positional relation in the rotational direction.

The tool-attached traction tool adapters are stored in, for example, a tool magazine in a machining center. Such a tool adapter is gripped at the annular groove in the grooved flange 2 by a changing hand and set on the main shaft of the machining center so as to have a predetermined angular positional relation.

Namely, the key on the main shaft is engaged with the keyway 23, and the taper shank 3 is inserted into the taper bore in the main shaft. The tension rod on the main shaft is screwed to the threaded bore 24 in the first embodiment (FIG. 1) or the threaded portion 24b in the rear section of the stepped threaded bore 24 in the second embodiment (FIG. 8) to draw the taper shank 3 inward, so that the traction tool adapter is combined firmly with the main shaft.

During this time, the front end portion of the anti-rotation pin 44 is engaged with the locking recess in the anti-rotation member on the front end surface of the main shaft, and the anti-rotation pin 44 is moved back against the resilient force of the compression spring 43, the regulating sleeve 47 engaging the front end surface of the anti-rotation member to be moved back against the resilient force of the compression spring 46, the locking arm 45 being disengaged from the positioning bore. Consequently, the fixed portion B, i.e. hollow housing 30, is immovably set, and the rotary portion A becomes rotatable with the main shaft as well as with the fixed portion B.

When the main shaft with which the traction tool adapter is thus combined is rotated, the hollow shaft 1 is rotated with respect to the housing 30. Accordingly, the planetary rollers 7 contacting the annular fixed track surface 32 turn around the axis of the main shaft as they rotate on the driving pins 8. As a result, the sun roller 52 contacting the planetary rollers 7, i.e. the tool T attached to the rotary shaft 50 is rotated at an increased speed as compared with the speed of the rotation of the rotary portion A, i.e. main shaft.

The thrust load on the tool T is supported by the main shaft via the rotary shaft 50, ball bearings 51, 51 and rotary portion A.

The cross-sectionally V-shaped rings 19, 20, 21 are rotated with the hollow shaft 1. Accordingly, when the hollow shaft 1 is rotated at a low speed, the contact lips 19a, 20a of the cross-sectionally V-shaped rings 19, 20 are moved slidingly on the projections 33, 34 of the non-rotating housing 20, while the contact lip 21a of the cross-sectionally V-shaped ring 21 is moved slidingly on the rear surface of the flange type labyrinth seal 53 in the tool mount portion C which is rotated at a higher speed than the hollow shaft 1.

However, when the hollow shaft 1 is rotated at a high speed, the contact lips 19a, 20a, 21a of the cross-sectionally V-shaped rings 19, 20, 21, which are outwardly opened, are bent in the closing direction due to the centrifugal force, so that the free ends of these lips disengage from the closely contacting points on one side thereof. Therefore, the sliding movements of the contact lips do not occur, so that the frictional heat is not generated.

Thus, a cutting (grinding) operation is carried out by the tool T rotated at a high speed. During this operation, the cutting (grinding) fluid is sent from the jacket recess 31 toward the ejection port 36 through the passage 37, and ejected therefrom onto a part being processed, to cool the intermediate portion of the housing 30, particularly the annular fixed track surface 32 subjected to heat generated by friction of traction drive.

During a cutting or grinding process, the entry of the ejected particles of the cutting (grinding) fluid into the interior of the traction tool adapter is prevented by the cross-sectionally V-shaped rings 19, 20, 21 while the shaft 1 is rotated at a low speed, and by the labyrinth seals 35, 18, 53 while the shaft 1 is rotated at a high speed, though the contact lips 19a, 20a, 21a disengage from the closely contacting points in this case.

It may be understood easily that the providing of a combination of the cross-sectionally V-shaped rings and labyrinth seals mentioned above can be applied to not only the traction tool adapters in the above embodiments in which the planetary rollers 7, 7, 7 are installed in the radial direction of the shaft 1 but also a traction tool adapter of some other types of construction.

In order to disassemble the tool mount portion of the above-described traction tool adapter in the second embodiment, a screw driver is inserted from the rear end surface of the taper shank 3 into the stepped threaded bore 24' and turned so as to turn the headless bolt 25 and advance the same toward the front end thereof. As a result, headless bolt 25 presses the rear end surface of the sun roller 52 at the rear end portion of the rotary shaft 50. Due to this pressing force, the sun roller 52 is disengaged from the planetary rollers 7, 7, 7 against the frictional force occurring due to the press-contacting force of the sun roller 52 and plantary rollers 7, 7, 7, so that the tool mount portion C is readily withdrawn from the front end of the traction drive tool adapter. When the screw driver is then turned in the opposite direction, the headless bolt 25 is moved back to the original position.

It may be easily understood that such a structure disassembled in this manner and such a disassembling operation can be applied to not only a traction drive tool adapter in which the above-described planetary rollers 7, 7, 7 are installed in the radial direction of the hollow shaft 1 but also a traction drive tool adapter of some other constructions in which the sun roller 52 and planetary rollers 7, 7, 7 are provided in press-contact with each other.

The present invention is directed to, for example, a traction drive tool adapter consisting of a rotary portion fitted firmly into the main shaft of a machine tool, a fixed portion joined detachably to the fixed portion, for example, the main shaft head, and a tool mount portion on which a tool is attached, the front half section of the rotary portion being provided with planetary rolling member inserting bores which extends radially from the outer circumferential surface of the rotary portion to the central bore, and also planetary rolling member driving shaft member-inserting grooves which continue from such two ends of the planetary rolling member inserting bores that are opposed to each other in the axial direction of the central bore, the driving shaft members which support the planetary rolling bodies being set in the front half section of the rotary portion so that the planetary rolling bodies and the end portions of the shaft members are inserted radially from the outer circumferential surface of the front half section of the rotary body into the relative bores and grooves, respectively.

Therefore, it is not necessary to use the method, which is employed in a prior art traction drive tool adapter, of inserting the driving shaft members for the planetary rolling bodies into the bores, which are made axially in the cylindrical circumferential wall of the hollow shaft, in the axial direction by pressfitting. This also makes it unnecessary to divide the rotary portion into the hollow shaft at the front end thereof, and the taper shank at the rear end thereof, and to combine them unitarily by the coaxially inserted bolt with the taper surfaces thereof unitarily engaged.

Accordingly, the connecting rigidity between the hollow shaft and taper shank does not decrease, and the possibility that the poor surface contact, which causes vibrations during the rotation of the rotary portion, between the engaged taper surfaces can be eliminated.

Moreover, since the rolling bodies can be displaced radially, they do not adversely affect the contact pressures of the rolling bodies with respect to the annular fixed track surface, the outer circumferential surface of the sun roller and the driving shaft members.

While a cutting or grinding operation is carried out by a rotating tool attached to the tool mount portion of the traction drive tool adapter according to the present invention, the entry of the cutting or grinding fluid into the interior of the tool adapter is prevented by the cross-sectionally V-shaped rings, the contact lips of which are in contact with the relative sections of the rotary portion, during the low-speed rotation of the hollow shaft. During the high-speed rotation of the hollow shaft, the contact lips of the cross-sectionally V-shaped rings are bent due to the centrifugal force and disengaged from the relative sections of the rotary portion, so that the frictional heat, which caused various problems to arise, does not occur. In this case, the entry of the cutting or grinding fluid into the interior of the tool adapter is prevented by the labyrinth seals instead of the cross-sectionally V-shaped rings which are installed along with the labyrinth seals.

If a disassembling thrust screw is provided in the rotary portion of a traction drive tool adapter having no suitable grip, the tool mount portion provided with a sun roller engaged at a predetermined level of press-contacting force with the planetary rollers in the rotary portion can be withdrawn easily during a tool mount portion disassembling operation from the front end of the tool adapter against the frictional, traction, force occurring due to this press-contacting force. Accordingly, the traction drive tool adapter is not damaged during a tool mount portion disassembling operation.

Moreover, in case the balls used in the ball bearings 10, 11, 11 and ball bearing 51, 51 are made of ceramics such as silicone-nitride base ceramics, the ball bearings are advantageous in that the rigidity for supporting the shaft 1 and the rotary shaft 50 are enhanced as compared with the conventional steel ball bearings, thereby preventing the housing 30 and the shaft 1 from becoming deformed under a load. This leads to the increased capacity for carrying loads. Another advantage is that the ceramic balls prevent the lubricant film thereon form deteriorating owing to a temperature rise caused by friction. This is of particular advantage for the bearings 51, 51 which rotate at a high speed.

Further, with the traction drive tool adapter of the present invention, since the bearing rings of the supporting bearings between the fixed portion, rotary portion and tool mounting portion which have a dual rotation structure to allow rotation of them relative to each other are mounted on those potions individually by tight fit, abrasion of contact areas of the rolling bearings by a rotational load can be prevented. And since an appropriate assembled condition between the planetary roller and the fixed ring is attained, the epicyclic roller speed increasing mechanism is improved in rigidity while no seizure will take place which may be caused by localized abrasion at rolling faces of the planetary roller and the fixed ring or by consumption of lubricant. Accordingly, improvement in rigidity and rotation with a high degree of accuracy of the high speed shaft of the tool adapter can be attained, and highly accurate cutting (grinding) work can be carried out.

Further, where the rolling bearings between the fixed portion, rotary portion and tool mounting portion are rolling bearings wherein at least rolling elements are made of ceramics, even if the bearing rings are mounted by tight fit, possible damage to the rolling elements upon rotation at a high speed ($15 \sim 20 \times 10^4$ in dmN value) can be evaded. Consequently, the effects of the present invention described above are maintained for a long period of time.

Also, since the ceramic rolling bearings are applied, even if cutting (grinding) fluid comes into the inside of the adapter and bearing lubricant is scattered by the cutting (grinding) fluid to cause consumption of the bearing lubricant, there is no possibility of damage to the bearings.

The present invention is not, of course, limited to the above embodiments; it may be modified in various ways within the scope of the appended claims.

We claim:

1. A traction drive tool adapter comprising:
   a fixed portion having a hollow housing detachably connectable to a fixed portion of a machine tool;
   an annular fixed track in said housing;
   a rotary portion comprising a front half section having an outer circumferential surface and a central bore and being inserted and supported rotatably via rolling bearings in said housing, and a rear half section mounted firmly to a main shaft of said machine tool;
   a tool mount portion having a sun member thereon with an outer circumferential section inserted into said central bore;
   rolling bearings mounted in said housing and supporting said tool mount portion rotatably with respect to said fixed and rotary portions;
   a traction drive mechanism connecting said tool mount portion to said rotary portion, said tool mount portion being adapted to hold a tool at the front end section thereof;
   said front half section of said rotary portion being provided with a plurality of planetary rolling member-inserting bores extending radially inwardly from said outer circumferential surface thereof into said central bore, each of said rolling member inserting bores having two opposite ends and planetary rolling member driving shaft member-setting grooves extending oppositely from said two ends of said rolling member inserting bore in the axial direction of said central bore;
   a driving shaft member having end sections mounted in said driving shaft member-setting grooves;
   a planetary rolling member in each planetary rolling member-inserting bore and mounted on a respective one of said driving shaft members; and
   an outer circumferential section on each planetary rolling member engaging said annular fixed track in said fixed portion and said outer circumferential section of said sun member on said tool mount portion.

2. A traction drive tool adapter as claimed in claim 1, wherein:
   said rolling bearings supporting said rotary portion and said tool mount portion are mounted in said housing and on said portions individually by a tight fit.

3. A traction drive tool adapter as claimed in claim 1, wherein: said rolling bearings have rolling elements made of ceramics.

4. A traction drive tool adapter as claimed in claim 3 wherein: said rolling bearings have bearing races made of ceramics.

5. A traction drive tool adapter as claimed in claim 2, wherein: said rolling bearings have rolling elements made of ceramics.

6. A traction drive tool adapter as claimed in claim 5 wherein: said rolling bearings have bearing races made of ceramics.

7. A traction drive tool adapter as claimed in claim 1 and further comprising:
   a cooling jacket recess in said housing for cooling said housing adjacent said annular fixed track subjected to heat generated by friction of said traction drive mechanism.

8. A traction drive tool adapter as claimed in claim 1 wherein:
   labyrinth seals having inner sides are provided at outer ends of relative rotary regions between said fixed portion, said rotary portion and said tool mount portion;
   spaces are provided on said inner sides of and adjacent to said labyrinth seals; and
   contact lip-carrying cross-sectionally V-shaped rings of an elastic material are fitted in said spaces.

9. A traction drive tool adapter comprising:
   a fixed portion having a hollow housing detachably connectable to a fixed portion of a machine tool;
   a rotary portion having a front half section in said housing;
   a central bore in said front half section;
   rolling bearings rotatably supporting said front half section in said housing;
   a rear half section on said rotary portion mounted firmly to a main shaft of said machine tool;
   a tool mount portion in said housing and inserted into said central bore, said central bore being open at said front end section of said rotary portion and adapted to hold a tool at the front end section thereof;
   rolling bearings in said housing rotatably supporting said tool mount portion for rotation with respect to said fixed and rotary portions;
   a rear end section on said tool mount portion;
   a sun roller on said rear end section;
   a plurality of planetary rollers in said rotary portion engaging said sun roller;
   a through bore extending from said central bore to an end of said rear half section of said rotary portion in the axial direction thereof;
   an internal screw thread in said through bore; and
   a male screw member engaged with said thread for connecting said rotary portion to said main shaft of said machine tool.

10. A traction drive tool adapter as claimed in claim 9 wherein:
    labyrinth seals having inner sides are provided at outer ends of relative rotary regions between said fixed portion, said rotary portion and said tool mount portion;
    spaces are provided on said inner sides of and adjacent to said labyrinth seals; and
    contact lip-carrying cross-sectionally V-shaped rings of an elastic material are fitted in said spaces.

* * * * *